United States Patent [19]

Norval et al.

[11] Patent Number: 5,357,902
[45] Date of Patent: Oct. 25, 1994

[54] SELF-MEDICATING APPLICATOR FOR CONTROLLING PESTS ON ANIMALS

[75] Inventors: R. Andrew Norval; Martin I. Meltzer, both of Gainesville, Fla.; Daniel E. Sonenshine, Virginia Beach, Va.; Michael J. Burridge, Gainesville, Fla.

[73] Assignees: Old Dominion University, Norfolk, Va.; University of Florida, Gainesville, Fla.

[21] Appl. No.: 102,599

[22] Filed: Aug. 5, 1993

[51] Int. Cl.$^5$ ............................................. A01K 29/00
[52] U.S. Cl. ................................................... 119/157
[58] Field of Search .......................... 119/156, 157, 158

[56] References Cited

U.S. PATENT DOCUMENTS

| 680,807 | 8/1901 | Pendleton | 119/157 |
|---|---|---|---|
| 988,669 | 4/1911 | Shuler | 119/157 |
| 1,095,471 | 5/1914 | Sheldon | 119/157 |
| 3,118,427 | 1/1964 | Stanzel . | |
| 3,137,274 | 6/1964 | Palmer | 119/157 |
| 3,159,144 | 12/1964 | Duncan et al. . | |
| 3,187,722 | 6/1965 | Gilmore et al. | 119/157 |
| 3,727,586 | 4/1973 | Brewster . | |
| 3,870,023 | 3/1975 | Wilson . | |
| 3,941,096 | 3/1976 | Mann . | |
| 4,023,533 | 5/1977 | Mann . | |
| 4,459,942 | 7/1984 | Cauthron . | |
| 5,027,747 | 7/1991 | Talley . | |

FOREIGN PATENT DOCUMENTS 8800079 7/1989 South Africa .

OTHER PUBLICATIONS

Drummond, R. O. et al. (1988) "Effects of Arthropod Pests on Livestock Production" Control of Anthropod Pests of Livestock pp. 1–27.

Sutherst, R. W. et al. (1982) "Tropical legumes of the genus *Stylosanthes* immobilize and kill cattle ticks" Nature 295:320–321.

McCosker, P. J. (1979) "Global Aspects of the Management and Control of Ticks of Veterinary Importance" Recent Advances in Acarology 2:45–53.

Norval, R. A. I. (1990) "The Impact of Pure Infestations of *Rhipicephalus appendiculatus* and *Amblyomma hebraeum* on the Productivity of Cattle and Implications for Tick Control Strategies in Africa" Parassitologia 32:155–163.

*Primary Examiner*—Gene Mancene
*Assistant Examiner*—Thomas Price
*Attorney, Agent, or Firm*—Saliwanchik & Saliwanchik

[57] ABSTRACT

The device is a self-medicating applicator that can be used for the treatment of animals with a pesticide for the control of pests, e.g., ticks and flies. The applicator device includes a feed bin, a reservoir for storage of the pesticide, and a porous column which passes through the pesticide reservoir and bait bin. Pesticide, drawn up the column by capillary action, is applied to the animal contacting the column while the animal is feeding from the bin.

17 Claims, 1 Drawing Sheet

SELF-MEDICATING APPLICATOR FOR CONTROLLING PESTS ON ANIMALS

FIELD OF THE INVENTION

The present invention is generally related to controlling populations of pests, e.g., ticks and haematophagous insects that attack herbivorous livestock, deer, and other herbivorous wild ungulates.

BACKGROUND OF THE INVENTION

Treating livestock and game animals to control ticks, biting flies, and similar haematophagous or noxious arthropods or other parasitic pests is essential to prevent major economic losses. These parasites pierce the skin of animals, causing damage to the hides, blood loss, and irritation, as well as transmission of deadly infectious diseases. These factors contribute to the enormous economic losses sustained by the livestock industry. Losses in livestock production (cattle, sheep, swine, and poultry) in the U.S. due to arthropod pests were estimated at more than $3 billion. This figure does not include the cost of pest control or losses to the equine industry (Drummond, R. O., J. E. George, S. E. Kunz [1988] *Control of Arthropod Press of Livestock: a Review of Technology*, CRC Press, Inc., Boca Raton, Fla., 245 pp.). Although precise figures for most countries are lacking, estimates of world-wide economic losses due to ticks and tick-borne diseases alone are in the billions of dollars.

Ticks affect approximately 800 million cattle and a similar number of sheep throughout the world (Sutherst, R. W., R. J. Jones, H. J. Schnitzerling [1982] *Nature* (London) 295:320–322). McCosker (McCosker, P. J. [1979] "Global aspects of the management and control of ticks of veterinary importance," In *Recent Adv. Acarology*, Rodriguez, J. D. (ed.), 2:45–53) estimated the world-wide impact of tick-borne diseases of cattle at approximately $7 billion. In addition to transmission of diseases, ticks cause severe damage due to failure of cattle to achieve expected weight gains and damage to hides to be used for leather. According to Norval (Norval, R. A. I. [1990] *Parasitologia* 32:155–163), weight losses in cattle are estimated at 4.4 grams per *Rhipicephalus appendiculatus* female and 10 grams per *Amblyomma hebraeurn* female. Estimates of losses in wildlife are unavailable; however, tick infestations of whitetailed deer (*Odocoileus virginianus*) in some areas are so severe that they have been reported to kill fawns (Drummond et al., supra).

Treatment or prevention of insect and tick infestations on animals, especially animals in the wild, is a formidable task. Thus, it is not surprising that no single, universally accepted method is available for this purpose. Common practices for delivering a pesticide, e.g., an insecticide or an acaricide, to livestock include (1) direct, whole-body treatment, where the animal's body is drenched with pesticide-containing liquids; (2) systemics, where the pesticide is allowed to circulate in the host's blood; and (3) controlled-release systems, which are usually physically attached to the animal and which release pesticide continuously over a period of weeks or months.

There are disadvantageous features to all of these previously described methods. Whole body treatments involve substantial waste. For pesticides to reach the stationary ticks, a direct animal treatment system must deliver acaricide over a wide area in order that adequate amounts of the toxicant will reach the non-motile parasites. In addition, for dipping or spraying, the animals must be herded and driven to, or through, the treatment area. Such procedures are both labor-intensive and stressful to the livestock. Moreover, due to the high potential for spillage, these operations pose significant environmental hazards for the surrounding area as well as health hazards for workers.

Systemics are generally not acceptable, especially for food animals, because of the toxic residues that can concentrate and remain in animal tissues for extended periods. Controlled-release devices, e.g., ear tags, risk infection or skin irritation when these devices are attached to the animal's body. None of these procedures are suitable for use with wildlife such as deer or other large herbivores.

An alternative to the methods described above is self-medication. In self-medication methods, an animal which is attracted to a device that offers a bait, e.g., food, materials for nest construction, etc., is sprayed or coated with pesticide-containing composition when the animal either contacts the device or in some way triggers the device to release the pesticide. Such methods offer an advantage over the previously described methods by minimizing the amounts of pesticide dispersed to the host and, consequently, into the environment.

One well-known example of a self-medicating device is the Duncan Applicator (ARIPO Patent No. AP/88/00079), which has been used to treat livestock and wild ungulates in Africa. The Duncan Applicator consists of a reservoir placed on top of a tall, threaded rod which is placed in a bin containing feed. The overhead reservoir releases an oily liquid pesticide mixture which slowly flows down the rod. When the animals place their heads in the bin to eat the feed, they touch the rod and receive a small amount of pesticide. The Duncan Applicator, due to its design, has limited utility for treating livestock and most wildlife. A principal disadvantage of the Duncan Applicator device is that the reservoir at the top of the threaded rod is small and is exhausted in a short period of time, usually requiring the device to be recharged every day. Such high incidence of maintenance makes the Duncan Applicator difficult to use in areas which may be inconvenient to reach or inaccessible under inclement weather conditions. Further, daily recharging of the Duncan Applicator incurs a high labor cost, making the cost of using the device unattractive.

Substituting a larger capacity reservoir on the Duncan Applicator would not provide a complete remedy to the disadvantage of high maintenance. A larger capacity reservoir would increase the tendency for the Duncan Applicator to tip over. If the device is tipped over, the result is a spill of the pesticide on the ground contaminating the environment. The subject invention is distinctly different from the Duncan Applicator in at least two important respects. First, it has a pesticide reservoir at the bottom of the device, and second, the subject invention relies on capillary action rather than gravity to supply pesticide to the contact surface. One advantage of the capillary system is that its slow release allows the subject invention to be used for many weeks, and even months, without recharging.

Other variations of self-medicating devices have also been described. U.S. Pat. No. 3,870,023 describes an insecticide applicator for livestock which utilizes a wind-powered spray device. This clearly is distinguished from the subject invention, which does not use a spraying device to apply insecticide. Nor does the subject invention rely on wind power to dispense insecticide.

Other combination feeder/applicators include the inventions described in U.S. Pat. Nos. 3,137,274, 3,187,772, 3,941,096, 4,023,533, and 4,459,942. Each of these patents discloses a feeder to attract livestock and a means for dispensing insecticide which is operable when contacted by the animal. However, none of these patents describe a device which incorporates the elements of the subject invention, namely, a reservoir disposed below the applicator contact surface or the use of capillary action to supply insecticide to the contact surface.

U.S. Pat. No. 3,118,427 describes a "bunt bag" which dispenses liquid insecticide when the bag is contacted by an animal. The '427 device essentially uses an absorbent material to surround the liquid pesticide storage area. U.S. Pat. No. 3,159,144 uses gravity to transfer insecticide from a cable or chain core, saturated with pesticide, to absorbent discs which surround the core. These devices also have limited reservoir capacity and require frequent maintenance.

The livestock offer disclosed in U.S. Pat. No. 3,727,586 also dispenses insecticide when the animal contacts the device. The '586 patent employs a reservoir which supplies pesticide by gravity to valves which open to dispense insecticide upon contact or rubbing of the valves by the animal. The apparatuses disclosed in U.S. Pat. No. 5,027,747 pertain to the use of absorbent wicks which contact an animal as it passes through a pathway.

It is therefore an object of the subject invention to provide an efficient, low-maintenance self-medicating applicator for large herbivorous mammals, e.g., cattle, wild deer, etc. The self-medicating applicator of the subject invention can store an amount of pesticide sufficient to make the applicator maintenance-free for several days, weeks, or months, and dispense a liquid pesticide externally to an animal in such a manner as to treat the animal and thereby deter or kill dangerous, disease-transmitting ticks and other biting insects.

BRIEF SUMMARY OF THE INVENTION

The subject invention concerns a device and a method for applying liquid to an animal. Preferably, the liquid can be a composition comprising a pesticide or other medicament which is usefully applied to an animal. In a preferred embodiment, the device comprises a base having a housing forming a reservoir for storage of the liquid and a bin for storage of a bait or other attractant. A pipe can be provided to allow for filling or draining of the reservoir. The subject device further comprises a smooth, porous applicator column. Typically, the porous applicator column will be a cylindrical column of ceramic material, which is disposed so as to contact, toward one end of the column, the liquid disposed within the reservoir, and which extends upward through the housing of the base to advantageously present a large contact surface for applying a liquid, e.g., pesticide to an animal. The porous column absorbs the liquid pesticide and thereby becomes saturated with pesticide. So long as the column is in contact with liquid in the reservoir, the column remains wetted as a result of capillary action.

The subject device can have the bait bin, which holds, for example, food, materials for nest construction, pheromonal preparations, other attractants, or the like, strategically disposed in relation to the column so that an animal, while obtaining a bait therefrom, will necessarily contact the column and thus apply to itself the liquid. As the liquid formulation preferably comprises an active ingredient, or medicament, e.g., pesticide, for treating the animal, the animal thus becomes treated with an appropriate medicament each time it contacts the saturated column. In this manner, the animal is treated regularly and, advantageously, without the undesired stress of human handling, or the expense of dipping stations, spraying equipment, and related facilities.

The subject invention advantageously provides a sturdy, yet light-weight, construction that facilitates transport but which is, by design, resistant to tipping over by animals, high winds, etc. when the device is in use. Therefore, it is one object of the subject invention to provide a low potential for tipping over, thereby reducing the risk of environmental contamination.

The subject invention further concerns a method for delivering a medicament, e.g., a pesticide, to an animal or treating an animal in need of a medicament, whereby the method employs the novel applicator device as described herein. More specifically, the method comprises placing the novel applicator device in an area accessible to the animal to be treated and supplying the applicator with a bait, e.g., feed, and an appropriate medicament.

DETAILED DISCLOSURE OF THE INVENTION

Figure 1:
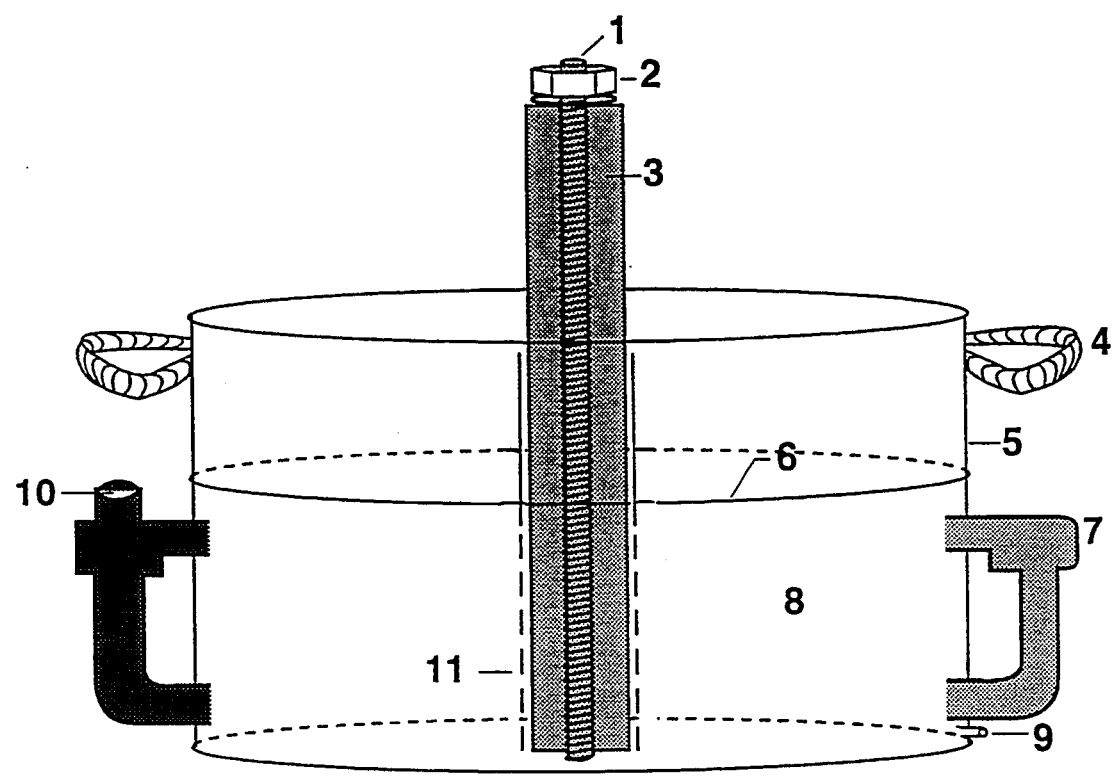
FIG. 1 depicts one embodiment of the device of the subject invention which comprises a base which houses a bait bin 5 having a floor 6 and a reservoir 8 for storage of a liquid, a porous column 3 centrally positioned in the base. As shown, the column is supported by a support means 11 and is affixed to the base by a rod 1, threadedly secured with a securing means 2. The liquid pesticide can be filled, drained, or monitored by a system of pipes 7, 9, and 10 extending through an aperture formed in the reservoir housing and into the reservoir. The porous column can be further supported by a support tube 11 disposed around the perimeter of the column. A means for facilitating transport, e.g., a handle 4 can also be provided.

The subject invention concerns a novel device and method for self-medicating an animal susceptible to infestation by pests, including pestiferous ticks and flies which can transmit disease. More specifically, the subject invention includes (1) a reservoir for storing and providing pesticide for use; (2) a porous column disposed within, and extending out of, the reservoir; and (3) a bait bin.

In one embodiment, the subject applicator comprises a base made from a corrosion-resistant material, e.g., a resinous composition, wherein the base forms a housing resembling a barrel which is divided into two sections—preferably, a lower and an upper section. The lower section, which is substantially closed, forms a reservoir for liquid pesticide or pesticidal composition; the upper section serves as a feed bin. In a preferred embodiment, the top, or ceiling, of the lower section, or reservoir, concurrently forms the floor of the upper section, or bait bin. Apertures can be provided as part of the base configuration which extend through the wall of the housing and into the reservoir. A tube or pipe can be fitted into the apertures to facilitate filling or draining the reservoir with pesticide, monitoring residual volume of liquid, and eliminating water accumulated from rain or dew. For example, in a preferred embodiment, the device can include a side-mounted filler pipe, monitoring tube, and drain pipe as shown in FIG. 1.

It will be appreciated by persons of ordinary skill in the art that other embodiments and materials can be used effectively for the housing of the subject device. For example, the base of the device forming the reservoir housing can be a variety of shapes or sizes, depending on the particular animal being treated or location or placement of the device while in use. Thus, the base of the device can be circular, triangular, rectangular, or of irregular shape, so long as a reservoir is formed within the base for storage of pesticide. The material used for the base can be a polymer or other resin material preferably forming a substantially rigid wall and bottom for holding a liquid or a feedstuff.

A column, which in the preferred embodiment is substantially cylindrical and comprises a ceramic material, can be attached to the bottom of the applicator device by any suitable fastening means. The subject invention can employ a plurality of columns; however, the subject invention is exemplified herein as having a single column disposed in the center of the base. The subject invention should have at least one column. Preferably, a rod is disposed through the central core or axial length of the column to provide support and which can be the fastening means to affix the column to the bottom of the base. In addition, the column can be supported by a support tube of any suitable rigid material, disposed around the perimeter of the column. Typically, the support tube is the same relative shape as the column. Further, in a preferred embodiment, the portion of the support tube disposed within the reservoir is perforated in order to allow the liquid within the reservoir to contact the column. The support tube extending from at least the floor of the feed bin to its uppermost edge is non-perforated and impermeable. Therefore, the column, which is allowed to be in contact with the pesticide, is physically separated from the bait or attractant provided in the bait bin. The support tube does not extend so far up the length of the column to prevent the animal from contacting the column as the animal feeds from the feed bin.

The support tube can be permanently or detachably affixed to the base of the device by any suitable fastening means. The support tube can, at one end, have a flange to facilitate affixing the support tube to the bottom of the base. For example, a permanent adhesive composition can be applied to the bottom side of the flange to adhere, and hold into place, the flange, thereby affixing the support tube to the base bottom. Screws, bolts, rivets, nails, etc. can also be used to affix the flange of the support tube to the base bottom. Preferably, in a case where screws, bolts, nails, or other fasteners which can puncture the reservoir, are used to affix the support tube, a sealant is used so that liquid from the reservoir does not leak from the reservoir.

The subject device can perhaps be best understood by reference to FIG. 1 showing the details of the preferred embodiment of the device. Referring now to FIG. 1, the preferred embodiment of the subject applicator device comprises a support rod 1 extended through the length of the porous column 3 and threadedly affixed to the housing or base of the device. The porous ceramic column 3 can be provided as sections or as a single column having a central aperture through its entire length for the insertion of the support rod. The housing 5 forms a base which can be divided into upper and lower sections. The upper section forms a bait bin, typically a feed bin, which is substantially open at the top to allow an animal to feed ad libitum. The floor 6 of the bait bin can be sealed to the sides of the housing with plastic cement and rubber sealant and separates the feed bin from the reservoir 8. The floor of the bait bin effectively serves as the top, or ceiling, of the reservoir.

To stabilize the column, a securing means 2, e.g., a threaded nut and a washer, can be threadedly affixed at the top of the support rod. Other securing means which are known in the art can also be used to secure the porous column. For example, the securing means can be a cap or nut which is non-threadedly affixed to support the rod. More specifically, other securing means can be a clamp, adhesive, weld, solder, or the like. A support tube 11 is provided at the base of the column. The support tube comprises a hollow tube circumferentially surrounding a porous ceramic column. The support tube is affixed to, and extends from, the bottom or floor of the housing 5 and through the floor of the bait bin 6. The support tube extends to the same approximate level as the top of the housing 5. From the floor of the bait bin, to the top of the housing, the support tube should be without any perforations. This will prevent any contact between the liquid pesticide absorbed into or adsorbed onto the ceramic column 3 and feed placed as bait into the bait bin. Below the bait bin floor 6, disposed within the pesticide reservoir 8, the support tube can have a plurality of perforations which allow the liquid pesticide composition to contact the ceramic column.

In the preferred embodiment, a visual monitor tube 7 for determining residual liquid in the reservoir can also be provided. The monitor tube comprises essentially three parts, namely (1) the upper part, a horizontal section of PVC pipe extending from the reservoir through the housing wall, secured with a mounting bracket and connected to a PVC elbow joint; (2) a lower part, also comprising a horizontal section of PVC pipe inserted through the wall of the housing into the reservoir, and secured with a mounting bracket, having a PVC elbow joint connected thereto; and (3) a section of clear PVC pipe extending upright from the lower elbow and connecting to the upper elbow. The device can further comprise a drain pipe 9, which extends through the side wall of the housing. The drain pipe can be plugged or capped by any appropriate means to prevent leakage. As a charging means for filling the reservoir, a filler pipe 10 extending at one end through the housing and into the reservoir can be provided and a funnel or other liquid-receiving means can be provided at the other end of the filler pipe. This charging means can be capped or otherwise plugged in order to prevent spillage or contamination with dust, debris, water, or the like. To facilitate transport and positioning of the subject device, a means for facilitating transport, e.g., at least one handle 4, can be provided. Preferably, at least two handles are provided which are located at diametrically opposite sides of the device housing.

The materials used and dimensions for the preferred embodiment are typically as described below. It should be understood and readily apparent that there exists a wide latitude in the exact dimensions of the subject device, and the physical dimensions and volumetric capacities can be readily altered to suit the need of the task at hand and/or the materials available. It is noted that, with the exception of the ceramic column itself, it is expected that all the materials used in the preferred embodiment are available and can be obtained from a commercial hardware or supply store or similar establishment.

In a preferred embodiment, the base or housing can be a resinous material approximately 57 cm wide by approximately 58 cm high. Any rigid, liquid-impermeable material can be used for the housing; however, it is preferable to utilize a non-corrodible material due to the weather conditions to which the device may be exposed during its use. For example, a plastic or other polymer or resin barrel having a volumetric capacity ranging from 5-50 liters can preferably be used. More preferably, plastic pickle barrels having a 10-30 liter capacity, which are readily obtained from a commercial hardware store, can be employed. The dimensions of the pesticide reservoir disposed below the feed bin is typically about 56.5 (I.D.) cm by about 28 cm high which can hold approximately 25 liters of liquid.

For charging or recharging the pesticide reservoir, a PVC pipe about 2.5 cm diameter (I.D.) by about 20 cm in length can be vertically attached m connect an upper and a lower horizontal pipe, about 3.2 cm diam. (I.D.) by about 10.2 cm long. The PVC pipe used can be of the type commonly used for plumbing and can be obtained from a commercial hardware or plumbing supply store. This vertical pipe can have a closeable aperture at the top for insertion of a funnel or spout to facilitate dispensing of the liquid pesticide composition into the reservoir. A clear PVC monitor tube, approximately 2.5 cm (I.D.) by about 18 cm long, can be vertically inserted to serve as a "sight glass" for visual monitoring of the amount of liquid remaining in the reservoir. By the term "sight glass" is meant any transparent or translucent component which can allow the level of liquid within the reservoir to be determined by sight. It would be readily apparent that other gauge apparatuses for the determination of residual liquid in the reservoir can also be employed.

The support tube can be PVC tubing or like material readily available at a commercial hardware store. The inner diameter of the support tube should be marginally larger than the diameter of the porous ceramic column. That is, the porous ceramic column should be able to easily slide in and out of the support tube. The support tube should be of sufficient thickness so as to impart stability and rigidity to the porous ceramic column when the column is mounted vertically inside the support tube. The support tube should be approximately the same height as the outer wall of the feed bin. The section of the support tube that is inside the pesticide reservoir should have a plurality of holes, slits, or other openings cut, drilled, or otherwise formed so as to allow the liquid pesticide formulation to easily and rapidly contact the column. However, the number, disposition, total area, and manner in which the perforations are made should be such that the resultant perforations do not markedly weaken the structural integrity of the support tube.

The porous ceramic column is typically about 7.5 cm in diameter by about 114 cm high. The column is manufactured from a ceramic material such as heavy duty firebrick (Thermal Ceramics, Augusta, Ga.). Other material can readily be substituted. Two criteria that a substitute material should preferably fulfill in order to be suitably and reliably substituted for the ceramic column are (1) the substituted material must be shown to allow the liquid pesticide to move by capillary action at a sufficient rate such that the outer surface of the column is continually wetted by the liquid pesticide; and (2) the substituted material must be sufficiently strong, that is non-friable or prone to breaking up or crumbling. Specifically, the material should be of sufficient strength or integrity to withstand frequent rubbing or contact by an animal using the device. The ceramic column can be assembled by fastening together approximately 4 or 5 individual sections which are each about 23 cm (9 inches) in length. The support rod extending through the center of the column sections can be fastened in a manner to force the column sections firmly against one another, thereby insuring continuing capillary action from the reservoir to the top of the column.

The support rod, readily available at a hardware store, is made from prethreaded steel and should be of sufficient diameter to allow easy passage through the center of the column, but also to provide adequate strength and support to the column. An excellent support rod is a bolt which is at least slightly longer than the entire length of the column through which it is disposed, and which can be threaded at both ends. Alternative materials can be used for the support rod, so long as the alternative material allows affixation of the porous ceramic blocks with sufficient force to ensure continuous capillary flow of liquid up the entire length of the assembled column. Alternatively, a single, 115 cm high column can also be used, in which case the support rod acts in a stabilizing capacity as well as preventing the break up of the column should the column experience cracks and other minor structural problems with use.

In using the applicator device, the device can be placed at any location accessible by the animal to be treated and, preferably, is in a location which also facilitates access by a person attending to the maintenance of the applicator device. A pesticide, or a composition comprising a pesticide and a carrier material, can be disposed within the reservoir so as to contact the column, migrate by capillary action up the ceramic column which is immersed in the liquid pesticide within the reservoir, so that the sides of the column are wetted. Animals attracted by a bait, e.g., food, placed in the bait bin of the applicator device insert their heads into the bait bin and, in so doing, contact the ceramic column with the top of the head, ears, or neck of the animal. At each contact, pesticide is transferred to the animal's hair and skin and spreads over the surface of the animal's body. A preferred pesticide composition can be an oily substance or mixed with a carrier which is an oily substance, e.g., mineral oil, to facilitate the spreading of the composition over the surface of the animal. With the pesticide coating the surface of the animal, flying insect pests are thus deterred from landing on and biting the treated animal. In addition, pests, e.g., ticks, fleas, etc., which infest the animals are killed by the pesticide. Repeated contact with the column each time the animal feeds from the bin increases the amounts of pesticide delivered to each animal. Contact between herd members during grooming, mating, or nurturing of young further disperses the pesticide, thereby reaching additional animals that do not directly contact the subject applicator device. Repeated visits on a daily basis by an animal provide continual pesticidal treatment, in contrast to the periodic treatments that occur when administered by spraying or dipping.

Some of the advantages of this treatment method are as follows:
1. It is entirely passive. Animals treat themselves.
2. Food used as bait to attract animals to the applicator device can easily be supplemented as needed, depending upon the rate of removal by the treated animals.
3. The large pesticide reservoir allows use of the device for many weeks or months without recharging, thus Saving valuable manpower.
4. The large, wide porous ceramic column of the preferred embodiment of the subject invention provides a broad treatment surface that contacts a large area of each animal's head, ears, or neck, facilitating pesticide transfer.
5. The monitoring tube provided on the side of each device allows a rapid determination of the quantity of liquid pesticide remaining in the reservoir, eliminating the need to dismantle the device to determine the level of pesticide remaining and facilitating the planning of the recharging schedule.
6. The size, weight, and design of the applicator device minimizes the risk and incidence of tipping the applicator, while the sealed reservoir prevents accidental discharge of the hazardous toxicant which may contaminate the environment.
7. Environmental contamination is further minimized because the only pesticide used is that which is applied to the target animals. There is no dripping or spraying as occurs with other self-medicating devices, and therefore excess pesticide is not likely to be spilled.

A variety of liquid pesticide compositions can be used. The pesticide can be mixed with mineral oil(s) or any other liquid substance which can act as a carrier and diluent. An important criterion for the diluent is that the resultant formulation containing the pesticide be capable of moving up the column by capillary action, and subsequently spreading the liquid formulation containing the pesticide onto the animals. One suitable example is a mixture of mineral oil, in a 3:1 volume ratio with a 1% (v/v) solution of permethrin insecticide in a suitable diluent. The rate of saturation of the column will be primarily controlled by the viscosity of the liquid pesticide composition or mixture. Therefore, it would be within the skill of a person in the an to determine the optimum viscosity of the pesticide composition in order to provide a capillary action rate adequate to rapidly saturate the column, but slow enough to prevent rapid depletion of the contents of the reservoir. The greater the percentage of mineral oil in the mixture, the slower saturation and depletion of the reservoir will occur.

It should be understood that any pesticide, insecticide, or acaricide, and the like, that can be formulated as a liquid composition and is meant to be applied to the exterior of an animal, is suitable for use in the applicator. Organophosphates, synthetic pyrethroids, amidines, and other groups of acaricides are examples of other suitable chemical pesticides that can be used. Specifically, in addition to permethrin, crotoxyphos, dichlorvos, chyalothrin, pirimiphos methyl, or malathion and the like are typical pesticides which can be used. Biological agents which can be formulated in a liquid and which can be carried up the column by capillary action can-also be used. Further, the applicator can be used to dispense any topical medicament that can be formulated in a liquid formulation and which can be moved by capillary action upward through the porous ceramic column. The applicator is particularly useful for applying any topical medicament that must be applied regularly to the head, ears, or neck of an animal which will be using the device.

Following are examples which illustrate procedures, including the best mode, for practicing the invention. These examples should not be construed as limiting. All percentages are by weight and all solvent mixture proportions are by volume unless otherwise noted.

EXAMPLE 1

Treatment of White-Tailed Deer Using Novel Applicator Device

Six applicator devices, substantially as described herein, were placed in an experimental area for the application of a pesticide (acaricide) to white-tailed deer (*Odocoileus virginianus*). Only three of the devices were charged with a pesticide. The remaining devices served as controls. Feed (corn) was placed in the feed bin of each applicator device and monitored for about one week. Deer were visually identified to feed at the device.

Tick infestation was assessed for a total of nine (9) deer taken from the experimental area and five (5) were taken from the control area. The results of the tick infestation determinations are shown in Table 1, below.

TABLE 1

| Tick infestations on white-tailed deer *Odocoileus virginianus* | | | | | | | |
|---|---|---|---|---|---|---|---|
| HOST | | | Ixodes dammini | | Amblyomma americanum | | |
| Age | Sex | Type Area | No. ♂ | No. ♀ | No. ♂ | No. ♀ | Nymphs |
| Adult | Male | Experimental | 1 | 1 | 2 | 0 | 0 |
| Adult | Female | " | 0 | 0 | 1 | 0 | 0 |
| Adult | Female | " | 0 | 2 | 2 | 0 | 0 |
| Adult | Male | " | 3 | 3 | 2 | 0 | 0 |
| TOTALS 4 DEER, 17 ticks Mean/Deer: 4.25 ticks/deer | | | 4 | 6 | 7 | 0 | 0 |
| Adult | Female | Control | 0 | 4 | 0 | 0 | 0 |
| Adult | Female | " | 0 | 3 | 3 | 0 | 0 |
| Adult | Female | " | 0 | 3 | 0 | 0 | 9 |
| Adult | Female | " | 0 | 5 | 0 | 2 | 2 |
| Adult | Female | " | 3 | 6 | 1 | 0 | 0 |
| TOTALS: 5 DEER, 41 ticks Mean/Deer: 8.20/deer | | | 3 | 21 | 4 | 2 | 11 |

It should be understood that the examples and embodiments described herein are for illustrative purposes only and that various modifications or changes in tight thereof will be suggested to persons skilled in the art and are to be included within the spirit and purview of this application and the scope of the appended claims.

We claim:

1. A self-medicating applicator device for external application of a liquid to an animal, said device comprising a porous column disposed within a base, wherein said porous column is a cylindrical column having a bottom end and a top end and an aperture through the axial length of said column, said base comprising a housing, having a side wall and a bottom, forming a reservoir and a bait bin.

2. The applicator device, according to claim 1, wherein said device further comprises a support tube disposed around the perimeter of said column.

3. The applicator device, according to claim 1, wherein said column has a support rod disposed within said axial aperture and wherein said rod is affixed by a fastening means to the bottom of said housing.

4. The applicator device, according to claim 1, wherein said column is secured by a securing means.

5. The applicator device, according to claim 4, wherein said securing means is a washer and a nut threadedly affixed at the top of the column to support rod.

6. The applicator device, according to claim 1, wherein said housing is divided to form an upper and a lower section.

7. The applicator device, according to claim 6, wherein said upper section of the housing forms a feed bin and said lower section of the housing forms a reservoir for storage of a liquid medicament composition.

8. The applicator device, according to claim 1, wherein said reservoir has a volumetric capacity of about 5 to about 50 liters.

9. The applicator device, according to claim 8, wherein said volumetric capacity of the reservoir is about 10 to about 30 liters.

10. The applicator device, according to claim 1, wherein said device further comprises a pipe extending through an aperture formed in the housing, said pipe extending into the reservoir for filling or emptying the reservoir.

11. The applicator device, according to claim 1, wherein said device further comprises a separate drain pipe for emptying the reservoir.

12. The applicator device, according to claim 1, wherein said device further comprises a monitor tube connected to the reservoir for monitoring the volume of liquid within the reservoir.

13. The applicator device, according to claim 13, wherein said monitor tube comprises a transparent pipe comprising polyvinylchloride.

14. A method for treating an animal with a liquid medicament, said method comprising:
(a) placing a self-medicating applicator device in the habitat of said animal, wherein said device comprises a porous column disposed in a base, wherein said porous column is a cylindrical column having a bottom end and a top end and an aperture through the axial length of said column, said base comprising a housing having a side wall and a bottom, said housing forming a reservoir and a bait bin;
(b) providing a bait in the bait bin as an attractant for the animal to be treated; and
(c) providing a liquid medicament composition in the reservoir.

15. The method, according to claim 14, wherein said liquid medicament composition is a pesticide.

16. The method, according to claim 15, wherein said pesticide composition comprises permethrin.

17. The method, according to claim 14, wherein said medicament composition further comprises mineral oil.

* * * * *

UNITED STATES PATENT AND TRADEMARK OFFICE
CERTIFICATE OF CORRECTION

PATENT NO. : 5,357,902
DATED      : October 25, 1994
INVENTOR(S): Norval, et. al.

It is certified that error appears in the above-indentified patent and that said Letters Patent is hereby corrected as shown below:

Column 12, line 13: Delete "according to claim 13," insert --according to claim 12--

Column 1, line 46: Delete "Amblyomma hebraeurn" insert --Amblyomma hebraeum--

Column 3, line 25: Delete "The livestock offer" insert --The livestock oiler--

Column 7, line 23: Delete "attached m. connect" insert --attached to connect--

Column 9, line 63: Delete "in the an" insert --in the art--

Column 10, line 67: Delete "changes in tight" insert --changes in light--

Signed and Sealed this

Twenty-fourth Day of January, 1995

Attest:

BRUCE LEHMAN

Attesting Officer     Commissioner of Patents and Trademarks